Dec. 5, 1967    W. NIEMEYER    3,355,767
GRANULATING APPARATUS FOR MELT EXTRUDED POLYMERS
Filed Nov. 23, 1965
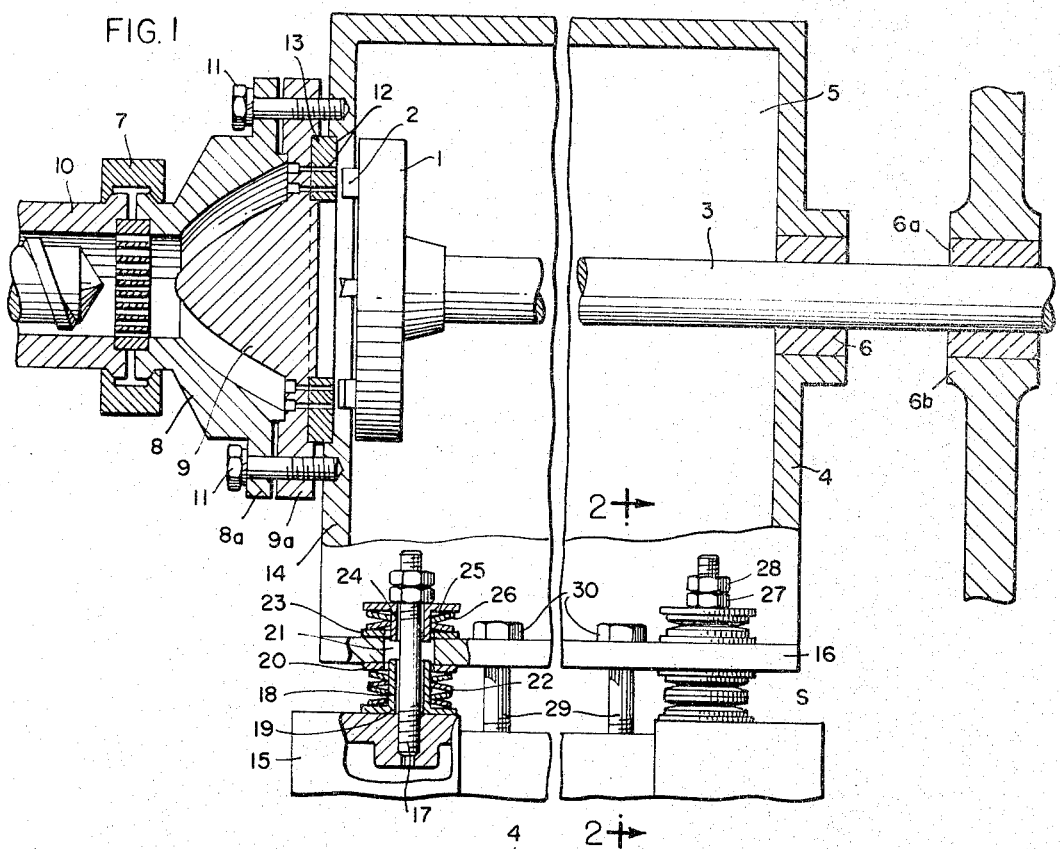
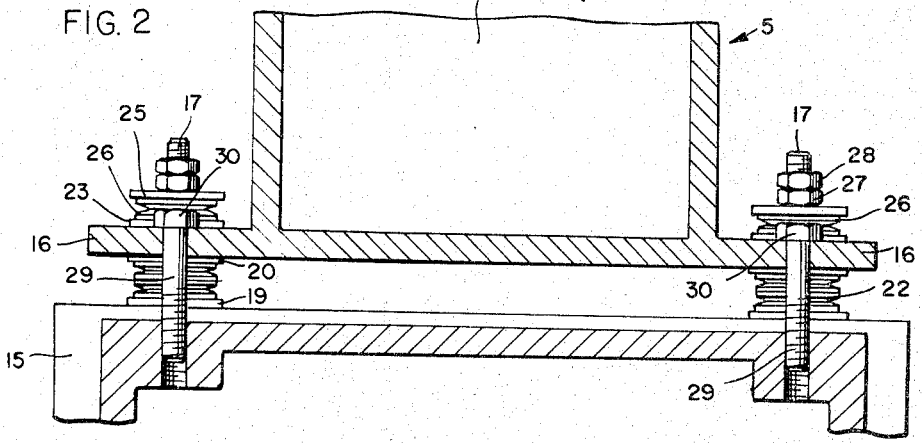
INVENTOR:
WALTER NIEMEYER
BY
Marzall, Johnston, Cook & Root
ATT'YS

United States Patent Office 3,355,767
Patented Dec. 5, 1967

3,355,767
GRANULATING APPARATUS FOR MELT EXTRUDED POLYMERS
Walter Niemeyer, Remscheid, Germany, assignor to Barmer Maschinenfabrik Aktiengesellschaft, Wuppertal-Oberbarmen, Germany
Filed Nov. 23, 1965, Ser. No. 509,355
Claims priority, application Germany, Nov. 27, 1964, B 59,858
6 Claims. (Cl. 18—12)

ABSTRACT OF THE DISCLOSURE

An underwater granulator for extruded thermoplastic polymer in which the granulating chamber is positioned to ensure the parallel relationship of the plane of a rotary cutter to the open face of the extrusion die by means of vertically adjustable elastic supporting members.

---

This invention relates to an improvement in apparatus for granulating a melt extruded synthetic thermoplastic polymer, particularly where the polymer is extruded and cut under water contained in a suitable granulating chamber. Still more particularly, the invention is concerned with an improvement in a combination of apparatus wherein the extruder is attached on one side of the granulating chamber and the drive shaft for the rotary cutter is journalled through the other side of the granulating chamber so as to position the cutting plane of the rotary cutter parallel to the open face of the die plate on the extruder, these various elements of the apparatus being arranged and supported in such a manner as to ensure the parallel relationship between the cutting plane and the flat surface of the die plate.

It is well known that thermoplastic materials such as synthetic polymers of all types may be readily granulated by extrusion through one or more orifices or bores in a die plate so that the polymer emerges in strand form and is immediately cut into pellets or granules by a rotating cutter assembly having one or more knife blades whose cutting edges describe a cutting plane positioned directly adjacent and parallel to the planar face of the die plate. In order to smoothly cut the extruded polymer and avoid deformation thereof, it is usually desirable to carry out the extrusion and cutting process in a granulating chamber containing any suitable cooling liquid such as water.

In arranging and assembling these elements of the granulating apparatus, i.e. the extruder, the rotary cutter and the granulating chamber, it is always quite difficult to align the rotary cutter in a cutting plane which is exactly parallel to the planar surface of the die plate, especially where the drive shaft for the rotary cutter is journalled freely for both rotational and reciprocal axial motion with its axis of rotation perpendicular to the planar face of the die plate and being aligned or parallel to the axis of the extruder, e.g. as defined by an annular die plate. This particular arrangement permits the rotary cutter attached to its drive shaft to be both rapidly shifted and finely adjusted axially through one side of the granulating chamber when placing the rotary cutter in the correct cutting position with reference to the die plate or die head mounted on the other side of the granulating chamber. See, for example, my copending application, Ser. No. 508,092, filed Nov. 6, 1965.

When assembling this particular apparatus, the granulating chamber with the rotary cutter must be centered and removably attached in a fixed position on the die plate or extrusion end of the usual screw extruder by means of screws or other suitable fastening means, and the drive shaft must be carefully journalled so that its axis of rotation is perpendicular to the planar surface of the attached die plate. However, the granulating chamber is thereby placed under certain bearing forces which make it difficult to properly center the die plate and to maintain the parallel relationship between the cutting plane of the rotary cutter and the surface of the die plate. Furthermore, even slight deviations lying within the manufacturing tolerances of the various elements tend to cause a distortion or displacement of the granulating chamber during assembly of the chamber in its fixed position on the extruder. A further disadvantage then arises because the distortion of the chamber causes inadmissible tensions in the structural material of the chamber wall and in the various elements and connecting means carried on this wall. In addition, after the apparatus is assembled, the bearing forces or tensions exhibited on the granulating chamber are also influenced by the addition of water or another liquid into the chamber and by various rotational and vibrational effects produced during operation of the apparatus. Differences in temperature between the extrusion die and the cooling liquid in the chamber also tend to dislocate the elements of the apparatus from their correct position.

One object of the present invention is to provide a novel and improved combination of apparatus for granulating a melt extruded polymer whereby the cutting plane of the rotary cutter can be maintained in exact parallel relationship to the flat surface of the die plate, thereby permitting troublefree operation of the granulator under a wide variety of operating conditions.

Still another object of the invention is to provide supporting means for the granulating chamber which will absorb the various bearing forces which are placed on the granulating chamber.

Yet another object of the invention is to provide adjustable supporting means for the granulating chamber so as to permit a careful assembly and positioning of this chamber in relationship to the other elements of the apparatus and to accomplish this adjustment in an economical and easily applied manner.

Still another object of the invention is to provide means whereby the granulating chamber can be dismantled and reassembled on the extruder without requiring constant readjustment of the apparatus elements.

These and other objects and advantages are achieved, in accordance with the present invention, by a combination of apparatus comprising: a granulating chamber having oppositely disposed bearing walls; a stationary carrying frame adapted to hold said chamber in a predetermined position; melt extrusion means including a perforated die plate for injecting at least one polymer strand into said chamber, one of the oppositely disposed bearing walls of the chamber being removably attached in a fixed position to this extrusion means; rotary cutting means including a drive shaft rotatably journalled in the other of the bearing walls of the chamber; and elastic means interposed between the granulating chamber and the stationary carrying frame, this elastic means including a plurality of elastic supporting members arranged to absorb the bearing forces being placed on the granulating chamber. The elastic supporting means are preferably vertically adjustable and displaced axially with reference to the cutter drive shaft and the extruder for individual vertical adjustments of the oppositely disposed bearing walls of the granulating chamber. Also, means are preferably provided to hold or block the adjustable elastic means in a fixed position when removing or attaching the granulating chamber to the extrusion means.

A detailed description of a preferred embodiment of the invention is set forth in the following specification and further illustrated by the accompanying drawing wherein:

FIG. 1 is a side elevational view, partly in cross-section and with certain portions removed, of granulating apparatus constructed in accordance with the invention; and FIG. 2 is a cross-section taken on line 2—2 of FIG. 1.

In the drawing, which is partly schematic, the rotary cutter including the tool head 1 and granulating knives 2 is mounted at one end of the rotatable and axially slidable drive shaft 3 which is journalled in one wall 4 of the water chamber 5 so as to be supported by the annular bearing member 6. A second bearing member 6a further supports the drive shaft 3 at a distance from the chamber wall, and the shaft can be rotated by a gear-driven wheel attached thereto or by any other suitable drive means. This second bearing member 6a is mounted in a support 6b which is connected to or part of the chamber 5, thereby fixing the shaft 3 in a position perpendicular to the chamber walls 4 and 14.

By means of a clamping ring 7, the extrusion head, which has an outer casing 8 and an inner or reentrant plug end 9 defining a passageway for the molten polymer, is firmly secured to the screw extruder 10. The two halves 8 and 9 of the extrusion head are formed with annular flanges 8a and 9a through which a plurality of screws or bolts 11 (only two of which are illustrated in the drawing) are inserted in order to removably attach or fasten the extrusion head to the wall 14 of the water chamber 5. An annular die plate 13 is tightly secured onto the end of the extrusion head in a circular recessed portion of the inner plug 9. This die plate 13 is perforated by a number of orifices or bores 12 which extend through the plug 9 to receive molten polymer from the divergent passageway of the extruder 10. The wall 14 of the chamber 5 contains a circular opening with an offset annular shoulder adapted to receive the die plate 13 in fitting engagement therewith and also adapted to act as a means of centering the extrusion head on the water chamber.

Although the cutter drive shaft 3 and the annular die plate 13 are thus arranged in opposing walls 4 and 14 of the water chamber 5 such that these elements can be initially assembled with the drive shaft perpendicular to the planar face of the die and with the cutting plane of the granulating knives or blades 2 parallel to the planar face of the die, it is also essential to support the chamber 5 in a manner which will compensate for different bearing forces or loads exerted on both of the opposing walls 4 and 14. Otherwise, if the chamber 5 is mounted in a stationary or rigidly fixed position, the drive shaft and rotary cutter are thrown out of alignment or else unacceptable stresses are placed on the walls of the granulator and various bearing and fastening elements.

These problems, as discussed more fully hereinabove, are solved in a highly satisfactory manner according to the invention by the preferred construction and arrangement of the chamber 5 for flexible or elastic mounting on the supporting or carrying frame 15 as shown in both FIGS. 1 and 2.

The carrying frame 15 is a sturdy frame-work or base housing structure adapted to stand on the floor of the machine room, but preferably on rails or a track so as to be axially slidable with reference to the axis of the extruder barrel, these details having been omitted from the drawing since they are quite conventional. Elastic or spring supporting members, as generally indicated by the letter S, are interposed between the granulating chamber 5 and the carrying frame 15 such that they rest on the latter and form an elastic connecting or coupling support attached to the lower side flanges or strips 16 which extend laterally outwardly from the base or bottom wall of the chamber 5. These elastic supporting members are preferably constructed in the form of a spring pack, especially an open helical compression spring or a so-called "plate spring," sometimes referred to as a compound disheddisc or bent-plate spring. However, it is also feasible to employ other elastic or spring members or materials, e.g. such as rubber cushions, having substantially the same function.

In order to provide the proper balance and absorption of bearing forces transmitted through the opposing side walls 4 and 14 and also to permit a careful balancing of the chamber through adjustable spring forces, it is desirable to place a spring or elastic supporting member S at each of the four corners of the chamber 5 and to provide means for individually adjusting the height or counterbalancing force of each spring pack as it is held under compression by the bearing forces exerted thereon. As shown in detail in the drawing, each spring pack is formed by a stud or set screw 17 with its lower end threaded into the carrying frame 15 and its lower central shank encased or enclosed by the tubular guide or shell 18 having a bottom flange or collar 19 resting on the frame 15. The top end of this tubular guide 18 extends through the opening of a washer or supporting disc 20 and slidably fits into a vertically bored hole or opening 21 extending through the strip 16. A plate spring 22 is held under compression between the bottom flange 19 of the tubular guide 18 and the supporting washer 20 which in turn is restrained by the lower surface of the strip 16. On the upper side of the strip 16, there is arranged another bearing washer 23 which fits around the lower end of a second tubular guide member 24. This second tubular guide 24 encloses the upper central shank and part of the upper threaded portion of the screw 17 and has an upper flange 25. The tubular guide 24 is also arranged so as to be slidably received within the side strip opening 21 but at a spaced vertical distance from the upper end of the lower tubular guide 18. A second plate spring 26 is placed around the upper tubular guide 24 and is adapted to be compressed between the bearing washer 23 and the upper guide flange 25 by tightening the two nuts 27 and 28 downwardly against the flange 25.

In assembling the apparatus, the granulating chamber 5 is placed over the studs or set screws 17 so as to rest on the spring supported discs 20, and the upper tubular guides 24 with the plate springs 26 and the bearing washers 23 are then inserted over each screw 17. The nuts 27 and 28 are then threaded down the screws 17 so as to place the plate springs 22 and 26 under compression, so that in axially sliding the chamber and the rotary cutter mounted thereon into position on the extruder, the spring supports are adjusted to accurately connect the die plate 13 in centered position. The extruder head pieces 8 and 9 are securely fastened to the wall 14 by the circumferentially spaced screws 11, and the extruder barrel or cylinder 10 is attached by means of clamping ring 7, so that the normally stationary extruder now carries the water chamber and attached rotary cutter fixed on the end of the extruder in a flexible or resilient spring supported position. The rotary cutting head 1 is connected to the drive shaft 3 and positioned adjacent the die plate 13 with a very narrow gap space between the cutting blades 2 and the die plate. An adjustment of the individual spring supports can be made while connecting the chamber to the extruder so that the cutting plane of the knife blades is exactly parallel to the exposed planar face of the die plate. The granulating chamber 5 can then be filled with water and the spring supports again adjusted, or else the chamber can be preloaded with a removable weight to make this additional adjustment. Then, after beginning the extrusion and granulation of the thermoplastic polymer, any stresses or bearing forces placed on the granulating chamber can be balanced or compensated by again adjusting the spring pack supports.

If it becomes necessary to temporarily remove or detach the granulating chamber from the extruder, for example in order to replace the die plate 13 or to clean the extrusion apparatus, it is especially desirable to maintain the previously determined adjusted position of the chamber 5. This can be accomplished by any suitable fastening means such as the retaining screws 29 threadably anchored in the carrying frame 15 and bridging or blocking the spring packs S at the adjusted distance from the frame 15. Thus, immediately after shutting off the extruder, the screws 29 are threaded in place until their heads 30 rest snugly on the top surface of the flange 16, thereby restraining any upward movement of the chamber when it is drained and detached from the extruder. When the apparatus is reassembled and during normal operation of the granulator, these screws 29 are completely withdrawn. This procedure avoids any necessity of completely readjusting each spring pack after every brief removal and replacement of the extruder on the granulating chamber.

By means of the particular combination and arrangement of the extruder, rotary cutter assembly and granulating chamber wherein the rotary cutter assembly is mounted on the chamber which is then supported solely on adjustable elastic means in accordance with the invention, the parallel relationship between the die plate and the cutting plane of the granulating knife edges can be easily and accurately established either during assembly of the apparatus or while it is in operation. Furthermore, the elastic or spring supporting members prevent an overly rigidized orientation of the granulating chamber during assembly and operation of the granulator which cannot be avoided when the chamber is rigidly supported.

At the same time, the spring mounted granulating chamber has the advantage that the individual springs or similar elastic means, which are spaced or positioned to absorb the bearing forces of the chamber and the members attached thereto, permit a balancing of the imprecise fittings or connections on the granulating chamber through their resilient characteristics without any appreciable change of the resultant bearing forces. Thus, deformation of the granulating chamber with a corresponding disturbance of the parallel relationship between the cutting plane and the die plate is completely avoided.

The particular spring characteristic values of the adjustable elastic supporting means can be readily selected to counteract or absorb the bearing load in providing a particular level of support for the granulating chamber. The minor adjustments necessary to achieve a very precise alignment of the drive shaft journalled in the vertically resilient chamber are very rapidly accomplished in a reliable manner, thereby avoiding the difficult and tedious adjustments which would be required by using a rigid support with interposed discs, shims or wedges. In addition, with the particular arrangement of a double spring positioned above the below the horizontally supported flange or strip of the granulating chamber, there is an advantageous damping of vibrations arising from the operation of the screw extruder and the rotating cutter assembly.

The improved granulating apparatus of the invention, through the stress-free and balanced support of the granulating chamber, permits the cutting or granulating of strands of a thermoplastic polymer in a remarkably uniform manner, and the adjustable spring or elastic means supporting the chamber are quite inexpensive and readily accessible without any need for fine tolerances or complex supplementary adjusting elements. Also, once the initial adjustment has been made for a particular granulating device, the invention provides means for fastening or maintaining the chamber in the desired position during temporary shut-downs.

Although only one embodiment of the invention has been illustrated, it will be apparent that other functionally equivalent granulating devices can be constructed within the spirit and scope of the invention, and it is therefore understood that the invention is not limited except as defined in the following claims.

The invention is hereby claimed as follows:

1. An improved apparatus for granulating a melt extruded synthetic thermoplastic polymer comprising:
   a granulating chamber having oppositely disposed bearing walls;
   a carrying frame adapted to hold said chamber in a predetermined position;
   melt extrusion means including a perforated die plate for injecting at least one polymer strand into said chamber, said extrusion means being adapted to receive one of said oppositely disposed bearing walls of said chamber removably attached in a fixed position thereto;
   rotary cutting means mounted on said chamber and including a drive shaft rotatably journalled in the other of said bearing walls of said chamber; and
   elastic means interposed between said granulating chamber and said carrying frame, said elastic means including a plurality of vertically adjustable elastic supporting members arranged to counterbalance the bearing forces being placed on said granulating chamber and to maintain the plane of said rotary cutter means parallel to the adjacent face of said die plate.

2. An apparatus as claimed in claim 1 wherein each of said elastic supporting members is individually and separately adjustable to vary the vertical counterbalancing force exerted upwardly beneath each of said opposing walls of the granulating chamber.

3. An apparatus as claimed in claim 2 wherein said elastic supporting members include a plate spring.

4. An apparatus as claimed in claim 2 wherein said elastic supporting members include a helical spring.

5. An apparatus as claimed in claim 1 wherein retaining means are removably secured to said carrying frame and to said granulating chamber as a rigid bridge spanning said elastic supporting members and adapted to hold them under compression during temporary removal of a bearing load.

6. An apparatus as claimed in claim 1 wherein said elastic supporting members are at least four in number arranged adjacent the four bottom corners of the granulating chamber on laterally extending side flanges.

References Cited

UNITED STATES PATENTS

| | | | |
|---|---|---|---|
| 1,574,985 | 3/1926 | McWain | 25—41 |
| 2,299,724 | 10/1942 | Appley | 25—41 |
| 2,422,480 | 6/1947 | Gordon | 18—12 |
| 2,512,117 | 6/1950 | Sims | 25—41 |
| 2,524,751 | 10/1950 | Berger | 18—12 |
| 2,594,894 | 4/1952 | Fehrenbach | 18—12 |
| 3,114,169 | 12/1963 | Palmer et al. | 18—12 |

WILLIAM J. STEPHENSON, *Primary Examiner.*